United States Patent [19]

Yoneda et al.

[11] Patent Number: 5,399,045
[45] Date of Patent: Mar. 21, 1995

[54] WATERPROOF CONNECTOR

[75] Inventors: Takahiro Yoneda, Kanagawa; Kimihiro Abe; Seiji Koumatsu, both of Shizuoka. all of Japan

[73] Assignees: Yazaki Corporation, Tokyo; Nissan Motor Company Limited, Yokohama, both of Japan

[21] Appl. No.: 77,989

[22] Filed: Jun. 18, 1993

[30] Foreign Application Priority Data

Jun. 22, 1992 [JP] Japan .................. 4-042895 U

[51] Int. Cl.⁶ .................. B25G 3/18; H01R 13/627
[52] U.S. Cl. .................. 403/321; 403/322; 403/326; 403/361; 403/409.1; 439/352; 439/357
[58] Field of Search .................. 403/321, 322, 325, 326, 403/361, 409.1; 439/352, 357, 358, 350, 271

[56] References Cited

U.S. PATENT DOCUMENTS

| | | | |
|---|---|---|---|
| 4,273,403 | 6/1981 | Cairns | 439/357 |
| 4,370,013 | 1/1983 | Niitsu et al. | 439/352 |
| 4,946,404 | 8/1990 | Takenouchi et al. | 439/352 |
| 4,979,910 | 12/1990 | Revil et al. | 439/358 |
| 4,986,766 | 1/1991 | Leonard et al. | 439/352 |
| 5,030,127 | 7/1991 | Blasko et al. | 439/358 |
| 5,083,933 | 1/1992 | Colleran et al. | 439/357 |
| 5,104,253 | 4/1992 | Zielinski et al. | 403/361 |
| 5,158,391 | 10/1992 | Fujitani et al. | 403/361 |
| 5,203,719 | 4/1993 | Kozono | 439/357 |
| 5,234,356 | 8/1993 | Maejima et al. | 439/352 |
| 5,246,380 | 9/1993 | Kodama | 439/358 |

FOREIGN PATENT DOCUMENTS 62-184674 11/1987 Japan .
64-36986 3/1989 Japan .

*Primary Examiner*—Richard A. Bertsch
*Assistant Examiner*—Howard R. Richman
*Attorney, Agent, or Firm*—Armstrong, Westerman, Hattori, McLeland & Naughton

[57] ABSTRACT

A waterproof connector comprises a male connector housing and an outer hood circumferentially provided on the male connector housing with an annular space therebetween, which contains a seal ring and into which is inserted a hood portion of a mating female connector to be brought into contact with the seal ring. A resilient locking arm of a double support structure is provided inside an outwardly bulged portion of the outer hood such that it is rearwardly supported on the part of the male connector housing and forwardly supported on the part of the outwardly bulged portion. This allows a male connector housing to be locked to a mating connector with an increased force, while making it possible to protect the resilient locking arm from external forces.

7 Claims, 6 Drawing Sheets

WATERPROOF CONNECTOR

BACKGROUND OF THE INVENTION

1. Field of the Invention

This invention relates to a waterproof connector mainly used for connecting automotive wiring harnesses.

2. Description of the Prior Art

One example of a conventional waterproof connector is disclosed in Japanese Utility Model Application Laid-Open Specification No. Sho 64-36986 and is constructed as shown in FIGS. 6 and 7. In FIG. 6, a male connector housing a is integrally provided, via a rear wall c, with an outer hood h in such a manner as to circumferentially enclose the housing a with an annular space s therebetween. A seal ring d is provided on the male connector housing a in the annular space s. A cantilever resilient locking arm e, which has a locking portion $e_1$ at its front end and an operating portion $e_3$ at its rear end, is provided on the male connector housing a via an intermediate support $e_2$ and accommodated inside a bulged portion $b_1$ of the outer hood b (FIG. 7).

FIG. 7 shows the male connector housing a in a coupled state with a mating female connector housing f, in which the male connector housing a is received in a hood portion $f_1$ of the female connector housing f to have their respective terminal lugs connected with each other, while the hood portion $f_1$ is in turn received in the annular space s to be pressingly brought into contact with the seal ring d and provide a watertightness. In this instance, the locking portion $e_1$ of the resilient locking arm e is engaged with an engagement projection g on the hood portion $f_1$ of the female connector housing f to lock the connector housings together.

In the prior art connector, however, since the locking arm e is supported in a cantilever manner by the intermediate support $e_2$, the force with which the connector housings are locked may not be sufficient.

Another example of a conventional waterproof connector is disclosed in Japanese Utility Model Application Laid-Open Specification No. Sho 62-18467 and is constructed as shown in FIGS. 8 and 9. In FIG. 8, a male connector housing a' is integrally provided, via a rear wall (not shown), with an outer hood b' to circumferentially enclose the connector housing a' with an annular space s' therebetween in which is contained a seal ring as mentioned above. On the outer hood b', a locking member is provided which comprises two spaced resilient locking arms e', each including a locking projection $e_1'$ and being doubly supported at its front and rear ends by front and rear supports $e_2'$ and $e_4'$, respectively. An operating portion $e_3'$ is bridgingly provided on the locking arms e', and an insertion guide slit p is formed in the outer hood b' between the locking arms e'.

On a female connector housing f' at the hood portion $f_1'$, an engagement rod g' is provided upright with laterally extended engagement projections $g_1'$ formed at the upper end.

On coupling the male and female connector housings a' and f', the hood portion $f_1'$ is received into the annular space s' and the engagement rod g' into the insertion guide slit p. As the engagement rod g' advances into the insertion guide slit p, its engagement projections $g_1'$ contact and resiliently displace the locking arms e' downwardly until the engagement projections $g_1'$ pass over the locking projections $e_1'$, whereat they engage the locking projections $e_1'$ to lock the connector housings together.

In the prior art connector, the resilient locking arms e' each is doubly supported and may provide a sufficient locking force. The resilient locking arms e', however, are entirely exposed to the outside even when the connector housings a' and f' are coupled and subject to external forces, resulting in the locking being unstable.

SUMMARY OF THE INVENTION

This invention has been accomplished to overcome the above drawbacks and its objective is to provide a waterproof connector with a locking member having a doubly supported locking arm, which locking arm is protectedly disposed inside an outer hood of a male connector housing.

To achieve the above objective, the waterproof connector according to this invention comprises: a male connector housing; an outer hood circumferentially provided partly or entirely around the male connector housing with an annular space therebetween, the outer hood including an outwardly bulged portion; a female connector housing extended by a hood portion; a seal ring contained in the annular space, contacted by the hood portion of the female connector housing when the hood portion is inserted into the annular space on fitting the male and female connector housings with each other; and a locking member comprising at least one resilient locking arm provided adjacent the outwardly bulged portion, the resilient locking arm being rearwardly supported on the male connector housing via a rear support and forwardly supported on an inner surface of the outwardly bulged portion via a front support, the resilient locking arm being provided at a point between the rear and front supports with locking means engageable with associated engagement means of the female connector housing to lock the male and female connector housings together.

The doubly supported resilient locking arm according to this invention allows the hood portion of the female connector housing to be inserted into the annular space since the front support of the locking arm is joined to the part of the outwardly bulged portion of the outer hood.

Further objects, features and advantages of this invention will become apparent from the following description of the preferred embodiment of the invention as illustrated in the accompanying drawings.

DETAILED DESCRIPTION OF THE PREFERRED EMBODIMENT

Figure 1:
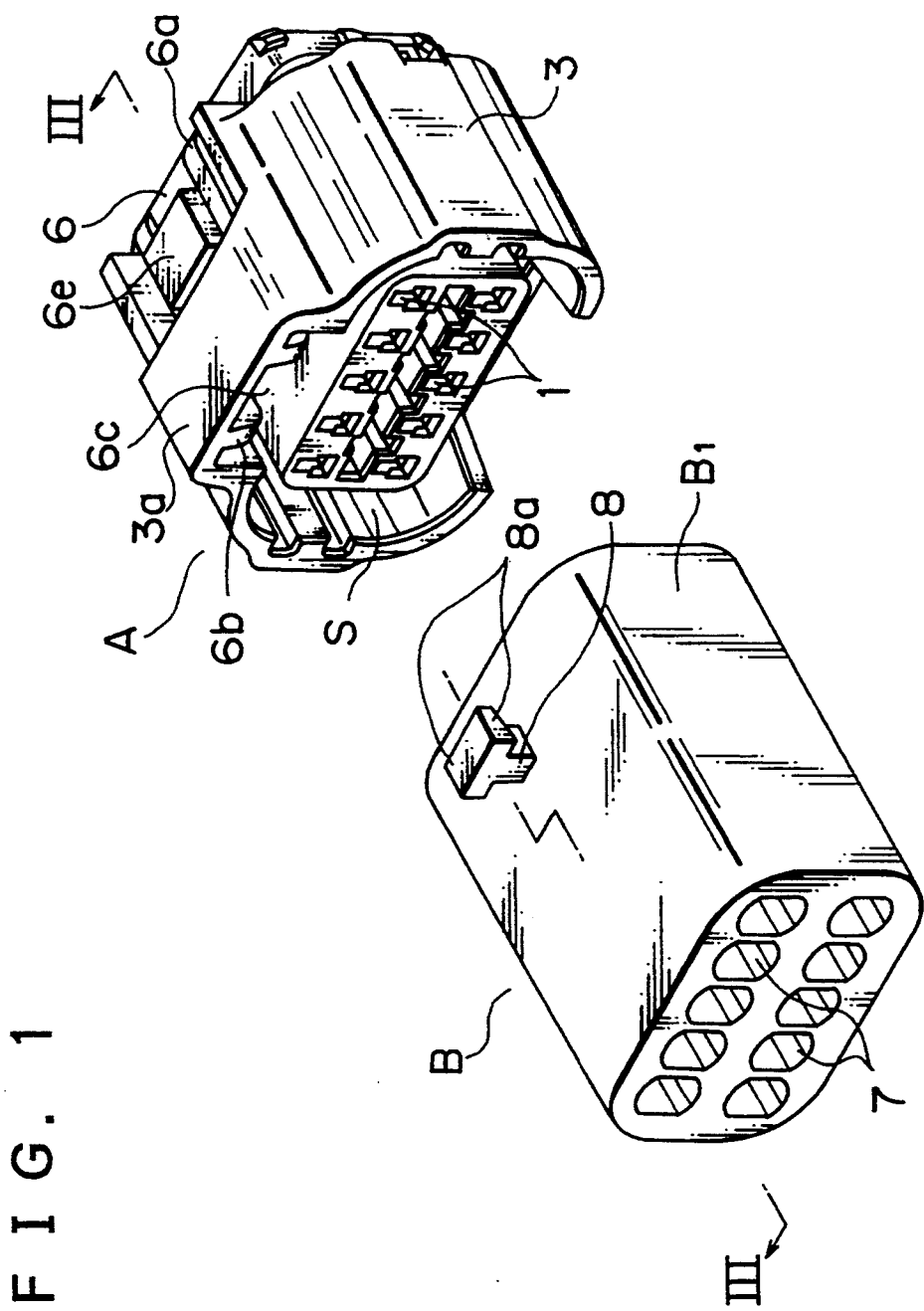
FIG. 1 is a perspective view of a female and male connector housing according to one embodiment of this invention, shown detached from each other.
Figure 3:
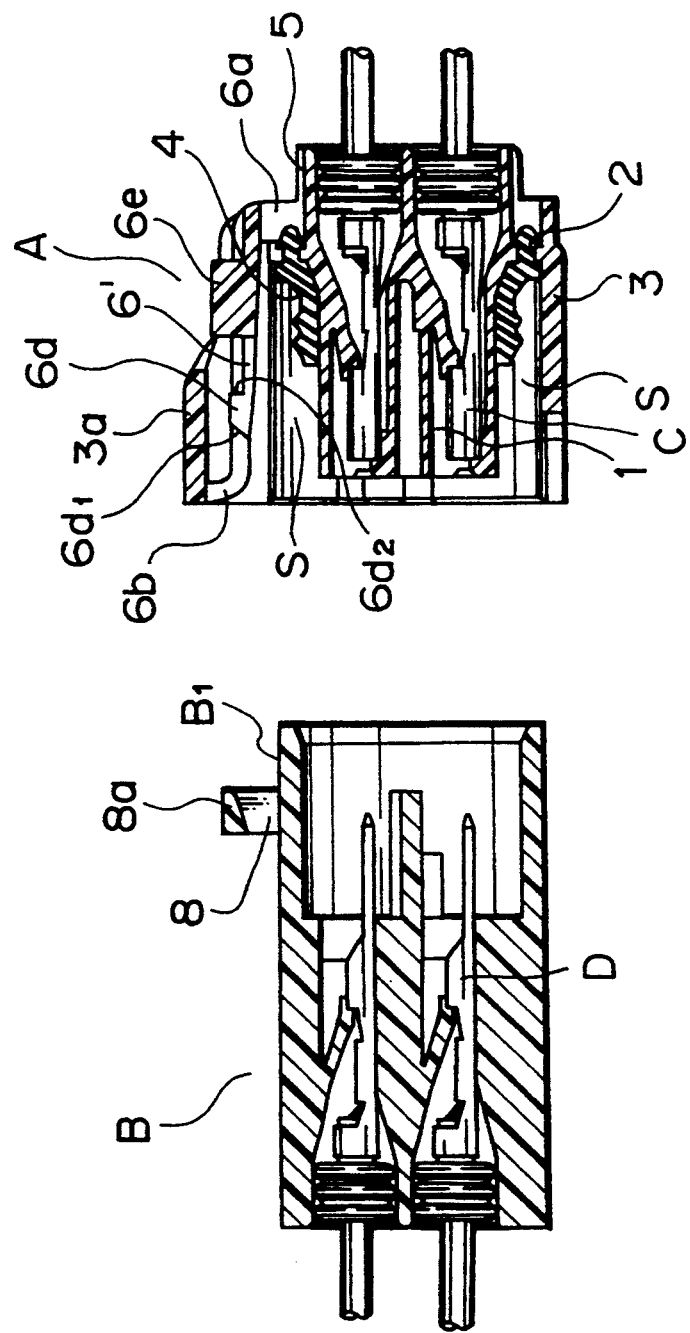
FIG. 3 is a cross sectional view of the female and male connector housings of FIG. 1 taken along the line III—III of that figure.
Figure 4:
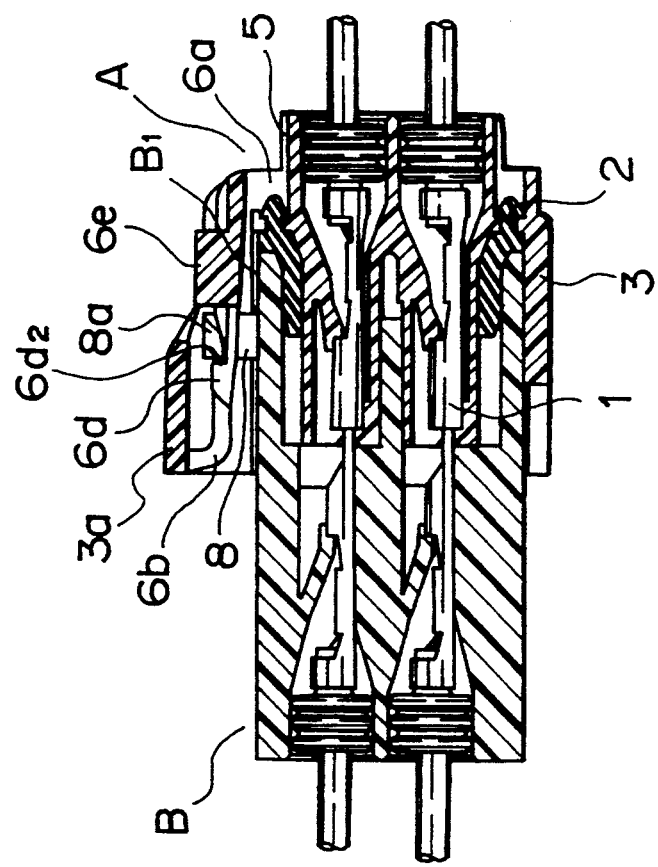
FIG. 4 is a cross sectional view of the female and male connector housings of FIG. 3 in a coupled state with each other.
Figure 6:
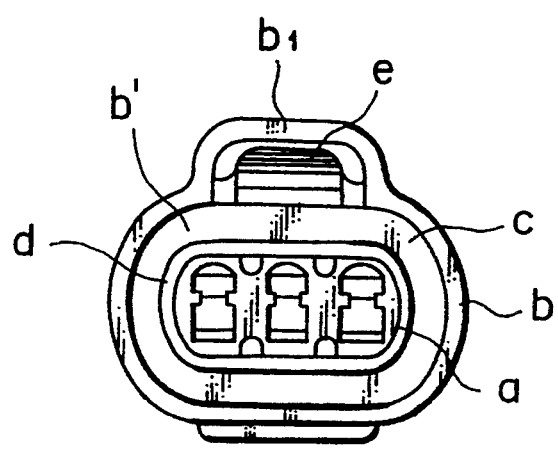
FIG. 6 is a front view of a conventional male connector housing.
Figure 7:
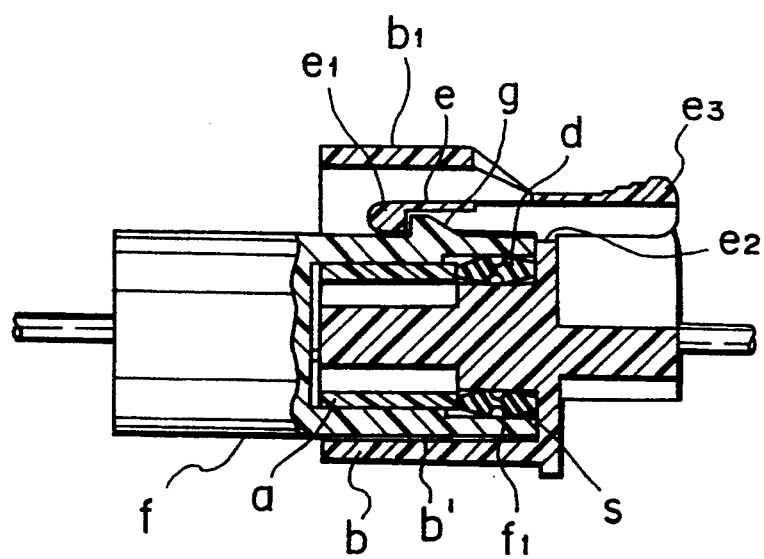
FIG. 7 is a cross sectional view of the male connector housing of FIG. 6 and a corresponding female connector housing in a coupled state with each other.
Figure 8:
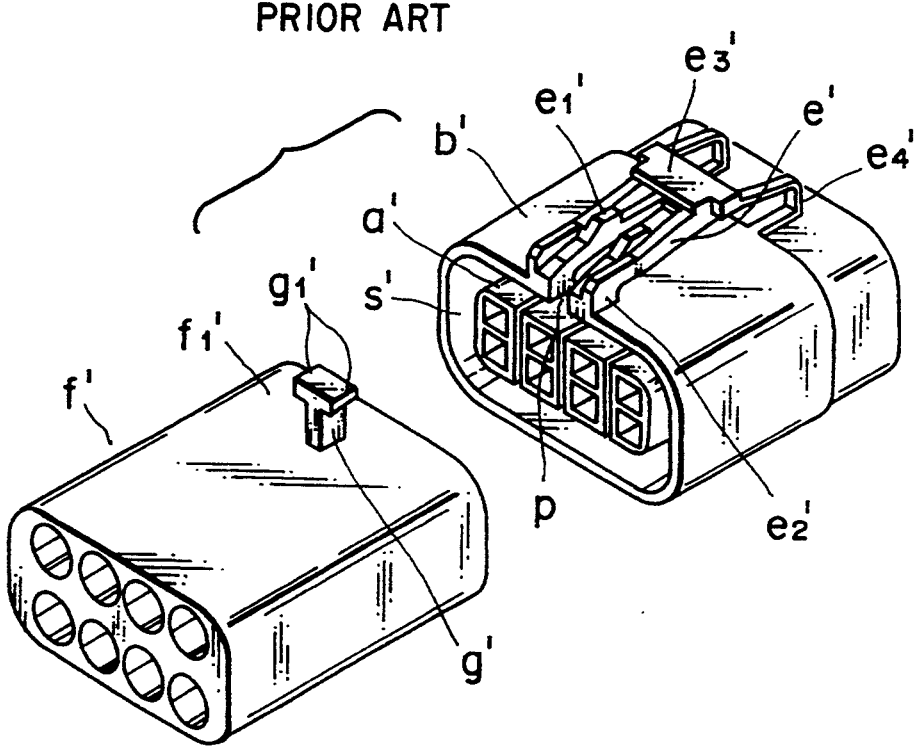
FIG. 8 is a perspective view of another conventional male connector housing, shown with a corresponding female connector housing.
Figure 9:
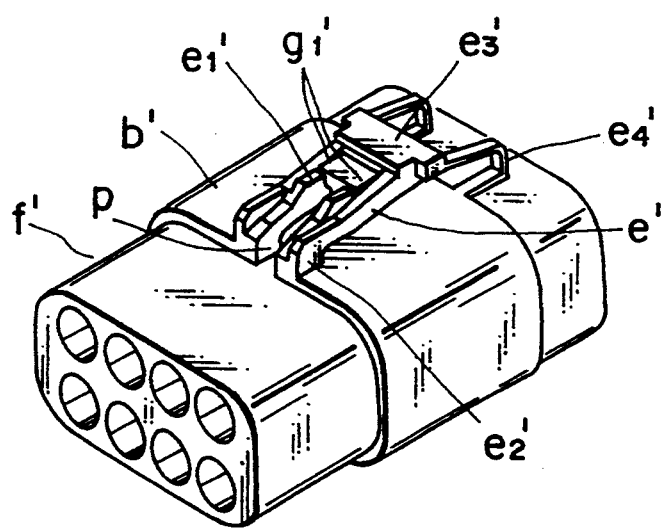
FIG. 9 is a perspective view of the female and male connector housings of FIG. 8 in a coupled state with each other.

Referring to FIG. 1, designated A is a male connector housing of a waterproof type, which has a plurality of terminal accommodating chambers 1 formed therein. The male connector housing A, as shown in FIG. 3, is integrally provided, via a rear wall 2, with an outer hood 3 such that the outer hood circumferentially encloses a substantial part of the outer periphery of the male connector housing A with an annular space S therebetween. In the annular space S is contained a seal ring 4 (FIG. 3). The outer hood 3 is formed with an outwardly bulged portion 3a.

Figure 2:
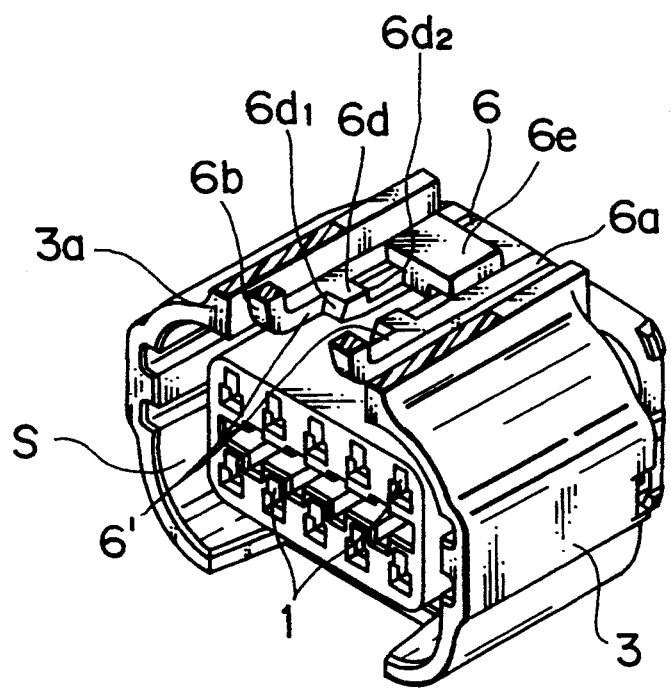
FIG. 2 is a partially cutaway perspective view of the male connector housing in FIG. 1.

A locking member 6 is provided in the annular space S adjacent the outwardly bulged portion 3a. The locking member 6 comprises two spaced resilient locking arms 6', 6' with a later-described receiving recess 6c formed at a forward portion therebetween. Each resilient locking arm 6' is rearwardly supported on an outer periphery 5 of the male connector housing A via a rear support 6a and forwardly supported on an inner surface of the outwardly bulged portion 3a via a front support 6b. The resilient locking arms 6', 6' are provided on their respective inner sides with locking projections 6d, 6d whose free ends face towards each other. Each locking projection 6d is tapered at the front end to provide a guide surface 6d1 and has a locking step 6d2 at the rear end (FIG. 2).

Designated B is a female connector housing with a plurality of terminal accommodating chambers 7 formed therein, which is extended by a hood portion B1. On an outer surface of the female connector housing B at the hood portion B1, an engagement rod 8 is provided upright which has laterally and oppositely extended engagement projections 8a, 8a formed at the upper end thereof. As shown in FIG. 1, the laterally and oppositely extended engagement projections 8a of the engagement rod can be tapered at a lower end in correspondence to a taper of the locking projections 6d. An operating portion 6e is bridgingly provided on the resilient locking arms 6' at a point apart from the outwardly bulged portion 6e.

In the above construction, on fitting the male and female connector housings A and B, the hood portion B1 of the female connector housing B is inserted into the annular space S of the male connector housing A, and the engagement rod 8 into the receiving recess 6c between the resilient locking arms 6' so that the engagement projections 8a get into contact with the tapered guide surfaces 6d1 at the front end of the locking projections 6d.

On further moving the male and female connector housings A and B towards a complete fitting, the engagement projections 8a cause the resilient locking arms 6' to be displaced downwardly until the former pass over the locking projections 6d, whereat the resilient locking arms 6' return to their original position, and the engagement projections 8a engage the locking steps 6d2 at the rear end of the locking projections 6d to lock the connector housings A and B together. In this locked state, the hood portion B1 of the female connector housing B is pressingly in contact with the seal ring 4 to provide a sealing effect, and the terminal lugs C and D respectively in the male and female connector housings A and B are electrically connected with each other.

Figure 5:
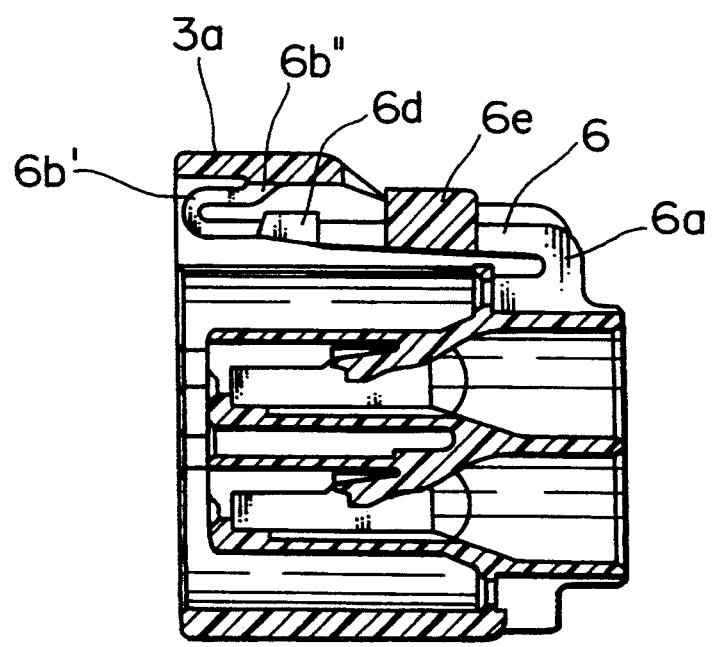
FIG. 5 is a cross sectional view of a male connector housing according to another embodiment of this invention.

Shown in FIG. 5 is a male connector housing according to another embodiment of this invention, in which a resilient locking arm of the locking member 6 is formed at the front end thereof with a rearwardly-crooked (i.e. rearwardly curved) portion 6b' which is joined, via a front support 6b'', to the outwardly bulged portion 3a at a point shifted backwards or inwards. This structure enables the resilient locking arm to be readily resiliently displaced when it is pushed down at the operating portion 6e.

As described hereinabove, in a waterproof connector according to this invention, since the locking member comprises a resilient locking arm of a doubly supported structure, the force with which the male and female connector housings are locked to each other is strengthened. Further, owing to the structure in which the locking member is disposed inside an outwardly bulged portion of the outer hood provided on the male connector housing, the locking member is protected from external forces.

What is claimed is:

1. A waterproof connector comprising:

a male connector housing having a forward end and a rearward end;

an outer hood circumferentially provided partly or entirely around the male connector housing with an annular space therebetween, the outer hood including an outwardly bulged portion;

a female connector housing having a forward end and a rearward end, the forward end of said male connector being brought within the forward end of said female connector housing when inserted therein, and said female connector housing having a hood portion extending at least partly therearound;

a seal ring contained in the annular space, contacted by the hood portion of the female connector housing when the hood portion is inserted into the annular space on fitting the male and female connector housings with each other and a locking member comprising at least one resilient locking arm provided adjacent the outwardly bulged portion, the resilient locking arm being supported at a rearward end thereof on the male connector housing via a rear support and being supported at a forward end thereof on an inner surface of the outwardly bulged portion via a front support, the resilient locking arm being provided at a point between the rear and front supports with locking means engageable with associated engagement means of the female connector housing to lock the male and female connector housings together.

2. A waterproof connector as claimed in claim 1, wherein the locking member comprises two spaced resilient locking arms, each supported at a rearward end thereof on the male connector housing and supported at a forward end thereof on the inner surface of the outwardly bulged portion, and wherein the locking means comprises two locking projections provided on respective inner sides of the resilient locking arms.

3. A waterproof connector as claimed in claim 2, wherein the locking projections are each tapered at a front end such that the associated engagement means of the female connector housing may be guided along the taper and each has a step portion at a rear end for engagement with the associated engagement means of the female connector housing.

4. A waterproof connector as claimed in claim 3, wherein the associated engagement means of the female connector housing comprises an engagement rod provided upright on an outer surface at a front portion of the female connector housing with laterally and oppositely extended engagement projections.

5. A waterproof connector as claimed in claim 4, wherein the laterally and oppositely extended engagement projections of the engagement rod are each tapered at a lower end in correspondence to the taper of the locking projections.

6. A waterproof connector as claimed in claim 2, wherein the locking member further comprises an operating portion bridgingly provided on the two resilient locking arms for operation of the resilient locking arms.

7. A waterproof connector as claimed in claim 2, wherein the resilient locking arms are each formed at a front end with a rearwardly-curved portion which is joined to the inner surface of the outwardly bulged portion at a point nearer to the rear of said male connector than a forward end of the rearwardly-curved portion.

* * * * *